(12) United States Patent
Fuehrer et al.

(10) Patent No.: US 7,406,531 B2
(45) Date of Patent: Jul. 29, 2008

(54) METHOD AND COMMUNICATION SYSTEM FOR DATA EXCHANGE AMONG MULTIPLE USERS INTERCONNECTED OVER A BUS SYSTEM

(75) Inventors: Thomas Fuehrer, Gerlingen (DE); Bernd Muller, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 662 days.

(21) Appl. No.: 10/034,606

(22) Filed: Dec. 28, 2001

(65) Prior Publication Data

US 2002/0116537 A1    Aug. 22, 2002

(30) Foreign Application Priority Data

Dec. 28, 2000  (DE) ................................ 100 65 115

(51) Int. Cl.
*G06F 15/16* (2006.01)
*G06F 9/46* (2006.01)

(52) U.S. Cl. .................. 709/232; 709/253; 709/238; 709/213; 709/248; 709/206; 370/486; 710/117

(58) Field of Classification Search ................ 709/253, 709/232, 238, 213, 248; 370/486; 710/117
See application file for complete search history.

(56) References Cited

U.S. PATENT DOCUMENTS

| | | | | |
|---|---|---|---|---|
| 5,694,542 A | * | 12/1997 | Kopetz | ........................ 714/49 |
| 5,706,278 A | * | 1/1998 | Robillard et al. | ............ 370/222 |
| 5,982,781 A | * | 11/1999 | Przybyla et al. | ............. 370/462 |
| 6,105,119 A | * | 8/2000 | Kerr et al. | .................... 711/219 |
| 6,816,504 B1 | * | 11/2004 | Erickson | ..................... 370/452 |
| 2002/0062415 A1 | * | 5/2002 | Wang et al. | ................. 710/240 |
| 2002/0085578 A1 | * | 7/2002 | Dell et al. | .................... 370/422 |
| 2002/0087763 A1 | * | 7/2002 | Wendorff | ..................... 710/100 |
| 2002/0180270 A1 | * | 12/2002 | Heckmann et al. | ......... 307/10.1 |
| 2003/0105557 A1 | * | 6/2003 | Horbelt et al. | ................. 701/1 |
| 2004/0030949 A1 | * | 2/2004 | Kopetz et al. | .................. 714/4 |
| 2004/0208181 A1 | * | 10/2004 | Clayton et al. | ........... 370/395.4 |

OTHER PUBLICATIONS

Bauer, G. and Kopetz, H., "Transparent Redundancy in the Time-Triggered Architecture." Jun. 2002, IEEE, entire document.*

* cited by examiner

*Primary Examiner*—Nathan Flynn
*Assistant Examiner*—Alina Boutah
(74) *Attorney, Agent, or Firm*—Kenyon & Kenyon LLP

(57) ABSTRACT

A method and a communication system for exchanging data between at least two users interconnected over a bus system are described. The data is contained in messages which are transmitted by the users over the bus system. To improve data exchange among users so that in the normal case, there is a high probability that it will be possible to transmit messages with a low latency, while on the other hand, in the worst case, a finite maximum latency can be guaranteed, the data be transmitted in an event-oriented method over the bus system as long as a preselectable latency period elapsing between a transmission request by a user and the actual transmission operation of the user can be guaranteed for each message to be transmitted as a function of the utilization of capacity of the bus system, and otherwise the data is transmitted over the bus system by a deterministic method.

20 Claims, 4 Drawing Sheets

METHOD AND COMMUNICATION SYSTEM
FOR DATA EXCHANGE AMONG MULTIPLE
USERS INTERCONNECTED OVER A BUS
SYSTEM

FIELD OF THE INVENTION

The present invention relates to a method and a communication system for exchanging data among at least two users which are interconnected over a bus system. The data is contained in messages transmitted by the users over the bus system.

The present invention also relates to a bus system for exchanging data between at least two users of a communication system.

In addition, the present invention also relates to a memory element for a user of a communication system connected to at least one other user over a bus system for exchanging data. A computer program stored on the memory element is capable of being run on a computer system of the user, in particular on a microprocessor. The memory element is designed in particular as a read-only memory, a random-access memory or a flash memory.

BACKGROUND INFORMATION

Networking of controllers, sensors, and actuators with the help of a communication system has increased greatly in recent years in the manufacture of motor vehicles. Synergistic effects are of primary concern through a distribution of functions to multiple controllers. In this connection, we speak of distributed systems. Communication among users of the communication system is taking place to an increasing extent over bus systems. Each user has a process computer which is connected via an interface to a communication controller over which the user is connected to the bus system. Communication traffic on the bus system, access mechanisms and receiving mechanisms as well as error processing are regulated according to a protocol.

A controller area network (CAN) protocol known from the related art has established itself in the automotive field. The CAN protocol is an event-controlled protocol, i.e., protocol activities such as transmitting a message are initiated by events having their origin outside the communication system. Unique access to the communication system is obtained by a priority-based bit arbitration. This requires that each communication be assigned a unique priority. The CAN protocol is very flexible because other users and messages can be added with no problem as long as free priorities (message identifiers) are still available.

In cases in which the average utilization of capacity of the bus system is relatively low, there is a very high probability that a user wanting to transmit a message will actually transmit its message immediately or within a very short period of time. Since CAN communication systems are typically designed so that the average utilization of capacity of the bus system is sufficiently low, high-speed access to the bus system is possible in the normal case. The worst case from the standpoint of the communication system, namely when all users want to transmit at all times, however, would mean, strictly speaking, an infinitely long latency in a CAN bus system. This would be true at least for messages having a relatively low priority.

For bus systems a probability may exist that a certain latency will not be exceeded in transmitting messages. FIG. 2 shows a probability distribution of latencies for an event-controlled communication system. The probability distribution has a relatively sharp peak in the vicinity of 0 (the probability for a very short latency is very high), but it extends to infinity (no maximum latency can be guaranteed). The probability distribution shows that an event-oriented communication system is very suitable for the normal case (very high probabilities for short latencies) but is not very suitable for the worst case. This may be further exacerbated if there is a fault in a high-priority user which is permanently transmitting high priority messages and thereby blocking the bus system. Consequently, messages having a lower priority cannot be transmitted. Messages having a low priority then have an infinitely long latency.

An event-oriented bus system is thus very suitable for applications in which the worst case is tolerable but value is attached to a very good performance in the normal case.

The time-triggered protocol for class C (TTP/C) is a relatively new protocol. This is a deterministic protocol, i.e., it is strictly time-controlled, redundancy being fixedly stipulated in the protocol. All communication activities on the bus system are strictly periodic. Protocol activities such as transmitting a message are triggered only by the progression of a (global) time base. Access to the bus system is based on allocation of time ranges in which a user has exclusive transmission rights. This protocol is relatively inflexible because new users can be added only when suitable time ranges have previously been released.

The probability of a user gaining access to the bus system when desired does not depend on prevailing utilization of bus system capacity. FIG. 3 shows a probability distribution of latencies for a deterministic communication system. Latencies depend only on the distance in time from the next transmission time. Since an access request of a user occurs outside the range of influence of the communication system, usually being asynchronous with it, the latency between the access request and the actual transmission of a message is equally distributed over the entire time interval between two transmission times. This is a much broader probability distribution than that with an event-oriented bus system, i.e., the probability of gaining access to the bus system after a very short period of time is much lower. However, this priority distribution is localized, i.e., the probability for any latency is zero. The probabilities are the same in the normal case and in the worst case, and an upper limit for the maximum latency may be given—in contrast with an event-oriented communication system. Deterministic communication systems are thus suitable for applications in which the worst case must be tolerated, even if restrictions must be accepted for the normal case. Therefore, preferred areas for use of deterministically controlled protocols include in particular applications in security-relevant areas (e.g., X-by-wire systems) or applications in which the difference between the normal case and the worst case is not very great.

It is also known from the related art that a time-controlled protocol can be made more flexible by reserving certain time ranges and having an event-controlled transmission of messages take place within the reserved time ranges. Thus, the overall protocol still functions on a time-controlled basis, and messages are transmitted on an event-controlled basis only in certain reserved time ranges. Depending on how access within the reserved time ranges is regulated, handling of the normal case and application-specific individual cases can be improved without losing the basic processability of the worst case (finite maximum latency). A bus system that functions in this way is known in the related art as a byte-flight bus or an SI bus.

SUMMARY OF THE INVENTION

An object of the present invention is to improve the exchange of data among multiple users which are interconnected over a bus system to the extent that there is a high probability that messages can be transmitted with a short latency in the normal case, while a finite maximum latency can be guaranteed in the worst case.

To achieve this object, the present invention proposes that data be transmitted in an event-oriented manner over the bus system as long as a preselectable latency elapsing between a transmission request of a user and actual transmission by the user can be guaranteed as a function of the utilization of capacity of the bus system for each message to be transmitted, while data is transmitted deterministically over the bus system.

If the communication system detects that finite maximum latencies can no longer be guaranteed for all messages or users of the bus system, the transmission of messages changes from an event-controlled mode to a time-controlled mode. An important advantage of an event-controlled system, namely high-speed access to the bus system in the normal case, is preserved completely because data exchange by the method according to the present invention takes place in these cases as it does in an event-controlled communication system. An important advantage of a deterministic communication system, guaranteeing a maximum latency and thus a much stronger determinism, is also completely retained with the method according to the present invention, because data exchange by the method according to the present invention for long latencies takes place exactly as it does in a deterministic communication system.

Data exchange by the method according to the present invention is therefore especially suitable for applications in which there is at least one message having the following properties:

In the normal case, the message can be transmitted with no problem using a strictly event-controlled protocol, and the average latency is relatively short.

The average latency in transmission via a purely deterministic communication system is much longer than the average latency with a purely event-controlled communication system. Although the behavior of the communication system in the case of an average latency of a strictly deterministic communication system is tolerable (at least for a limited period of time, e.g., for several hours during the entire life of the vehicle), it is much worse than that in the case of an average latency of a strictly event-controlled system, but this behavior is not tolerable over the entire lifetime of the vehicle.

A latency much longer than the average latency of a strictly deterministic communication system (e.g., more than twice as long) is not tolerable.

In developing a communication system, a demand for a maximum latency within which the message must be transmitted is stipulated for each message to be transmitted over the communication system. The communication system does not fulfill its function with regard to time if it cannot transmit within the stipulated maximum latency at least one of the messages to be transmitted. In the case of an event-controlled protocol, a bus system without utilization of capacity always means that there is no message at the present that any of the users would like to transmit. From the standpoint of the communication system, this status is not critical if there is a bus system without utilization of capacity sufficient frequently. It is therefore suggested that the critical state at which the system switches from an event-oriented data transmission to a deterministic data transmission should be defined by the fact that such a pause (bus system without utilization of capacity) occurs at least during a certain period of time.

It is therefore proposed according to an advantageous refinement of the present invention that the utilization of capacity of the bus system over time should be monitored, and it is assumed that the stipulable latency cannot be guaranteed for each message to be transmitted if the uninterrupted utilization of time capacity of the bus system exceeds a time threshold which may be stipulated in advance. A physical time is thus observed according to this refinement. If uninterrupted time utilization of the bus system exceeds a preselectable time threshold, or if a number of messages transmitted directly in succession over the bus system exceeds a preselectable threshold, the communication system must assume that too many users always want to transmit messages and a maximum latency can no longer be guaranteed for low-priority messages.

As an alternative, it is proposed that utilization of capacity of the bus system be monitored and that it be assumed that the preselectable latency cannot be ensured for each message to be transmitted if the number of messages transmitted directly in succession over the bus system exceeds a preselectable threshold. The current number of messages transmitted directly in succession may be incremented by one or by any other desired value either before or after the actual transmission of the messages. As soon as there is a pause on the bus system (bus system without utilization of capacity), this number is reset at 0 or initialized at any other value. The alternative embodiment is advantageous because it can be implemented especially easily.

In particular, in bus systems that operate according to a distributed principle, all users of the communication system are aware of the threshold values and are thus able to recognize a critical state simultaneously. However, in communication systems having a master user in particular, it is conceivable for the critical state to be detected by only one user or by a few selected users.

In order to make recognition of critical states error-tolerant, it is proposed according to a preferred embodiment of the present invention that messages transmitted by a user over the bus system in direct succession also be counted by the user, and that the current number of messages transmitted in direct succession over the bus system to the other users of the bus system be transmitted. The current number of messages being transmitted in direct succession may be transmitted, for example, in a message to be transmitted along with the other messages. Each user has the option of checking, error detection and, if need be, error handling. With a CAN bus system, error handling may involve, for example, sending an error frame or setting a suitable non-acknowledgment flag (NACK).

If an error is detected in a transmitted message in the course of a data transmission, the message is destroyed by transmitting an error frame on the bus system. If a user is constantly transmitting error frames because of an error, then all messages transmitted over the bus system are destroyed and data exchange over the bus system is no longer possible. The problem of a faulty user destroying all messages can be overcome by using error counters.

Transmission of the current number of messages being transmitted in succession may also take place without any additional load on the system (overhead). To this end, whenever a cyclic redundancy check (CRC) or some other checksum is transmitted with the message at some time to ensure the data content, the CRC or checksum is performed not only over the data but over the data and the number of messages without altering the length of the resulting CRC element or checksum. For a suitable choice of CRC polynomial, it is also possible to generate a sufficiently large Hamming distance, thus permitting error-tolerant transmission of the CRC element or checksum. The receiver forms a CRC checksum over the data received combined with its view of the number of messages transmitted in direct succession. If a difference is found, there is an error in the data transmission or in the number. If the Hamming distance is large enough, it may even be possible to determine where the error is located. In this case, error-tolerant transmission of the number of message transmitted in direct succession is possible without using any additional communication resources, and the corresponding detection of the critical state is also error-tolerant.

According to an advantageous refinement of the present invention, it is proposed that the transmission of data be switched from a deterministic transmission over the bus system to an event-oriented transmission when a predetermined end of the deterministic transmission is reached. It is in the nature of a deterministic data transmission that the end of the data transmission is predetermined. When this end is reached, the communication system is switched back to an event-oriented transmission.

There are various possibilities for the target state in which data is transmitted deterministically over the bus system and maximum latencies can be guaranteed. According to a preferred embodiment of the present invention, it is proposed that the deterministically transmitted data be transmitted in a time-controlled method, in particular a time-division multiple-access (TDMA) based method. In a TDMA-based communication system, all messages for which a maximum latency guarantee is provided alternate periodically. A "schedule" has already stipulated in advance which user may transmit in which time slot. The "schedule" must be given to the communication controllers of the users as early as the time of development. The "schedule" must include only those messages for which a maximum latency guarantee is given. The "schedule" is designed preferably only for an adequate (not optimum) performance of the critical functions.

According to another preferred embodiment of the present invention, it is proposed that the deterministically transmitted data be transmitted with dynamically variable priorities of the messages or message groups in a priority shift-based method. A priority shift-based data transmission over the bus system is based on a dynamic change in the priorities of the messages to be transmitted during operation of the bus system. In the case of a priority shift-based transmission, no "schedule" needs to be known in advance. Nevertheless, a finite maximum latency may be guaranteed for the messages. Priority shift-based data transmission has been described in detail in another German Patent Application by the same applicant (applicant's application no. R.39890) having the same filing date as the present patent application. Reference is herewith made explicitly to this patent application.

All the users of the communication system are capable of detecting the critical state simultaneously and in an error-tolerant manner, so the transmission from event-oriented data transmission to deterministic data transmission and back again may also take place in an error-tolerant manner. There are several options for this transition.

First, the transition may be triggered by an explicit message. This message is transmitted by the user having the highest priority. If this explicit message is not transmitted, the user having the next higher priority must assume this task. Depending on the event-controlled protocol used as the basis, transmission of the explicit message may take place without any additional time loss. In bit arbitration such as that implemented in a CAN bus system, there are n users that may transmit a corresponding message, where n also characterizes the error tolerance level. High priorities are reserved for this message.

After detection of a critical state in the communication system, each user must attempt to transmit an explicit message. If the priorities for explicit messages are very high, all other users must then receive a transmission disable. The actual transmission operation and optionally also the content of the explicit message trigger and then determine the course of the subsequent deterministic data transmission.

Another possibility is implicit notification of the users of the communication system regarding the existence of a critical state. Detection of a critical state per se causes data transmission to be switched over. All communication controllers switch from event-oriented data transmission to deterministic data transmission and then use the corresponding protocol for further data transmission as soon as the critical state (error-tolerant) has been discovered.

The time for switching back from deterministic data transmission to event-oriented data transmission will depend on the type of deterministic data transmission selected. One possibility is to include in the message format of the deterministic data transmission a status bit which indicates whether or not the transmitter application would in fact still like to claim the common transmission frequency for itself. Then if a sufficiently low number of users report a request to transmit a message over a sufficiently large number of periods in a deterministic system, it will switch back to the event-oriented mode. The switch back may also be accomplished either explicitly or implicitly.

Another basically different method is for a transmitter application which no longer wishes to claim the common transmission frequency for itself to transmit a "dummy message," the existence of which contains the same information as the above status bit. The number of "dummy messages" transmitted is detectable and, if a sufficient number of "dummy messages" is transmitted over several periods of the deterministic system, it is possible to switch back to the event-oriented mode.

As another method of achieving the object of the present invention, it is proposed that the communication system should have means for monitoring the utilization of capacity of the bus system, means for an event-oriented transmission of data over the bus system, means for a deterministic transmission of data over the bus system and means for selection of an event-oriented or deterministic transmission, said means selecting an event-oriented transmission as long as a preselectable latency elapsing between a transmission request on the part of a user and actual transmission on the part of the user can be ensured, depending on the utilization of capacity of the bus system, for each message to be transmitted, and otherwise the means will select a deterministic transmission.

According to an advantageous refinement of the present invention, it is proposed that the communication system shall have means for carrying out the method according to the present invention.

As yet another means of achieving the object of the present invention, it is proposed that the method according to the present invention shall be carried out using this bus system.

Of special importance is the implementation of the method according to the present invention in the form of a memory element which is provided for a user in a communication system which is connected over a bus system to at least one other user for exchange of data. A computer program capable of running on a computer device of the user, in particular on a microprocessor and suitable for execution of the method according to the present invention is stored on the memory element. In this case, the present invention is thus implemented by a computer program stored in the memory element, so that this memory element provided with the computer program represents the present invention in the same way as the method for whose execution the computer program is suitable. A suitable memory element would include in particular an electric memory medium, e.g., a read-only memory, a random-access memory or a flash memory.

Finally, the present invention also relates to a computer program suitable for carrying out the method according to the present invention when run on a computer system, in particular a microprocessor of a user of a communication system connected to at least one other user over a bus system for exchange of data. It is especially preferable if the computer program is stored in a memory element, in particular a flash memory.

DETAILED DESCRIPTION

Figure 1:
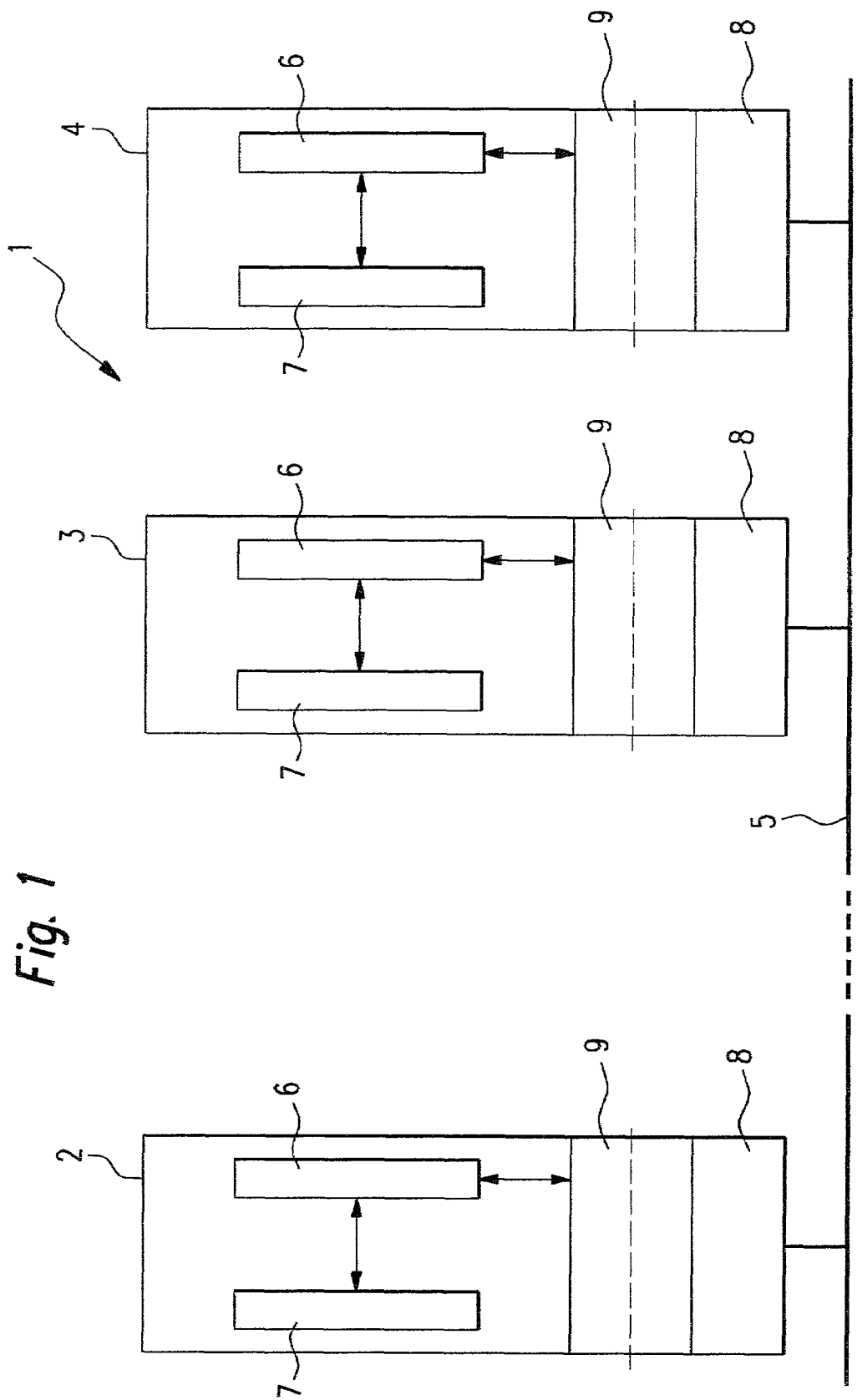
FIG. 1 shows a communication system according to the present invention according to a preferred embodiment.

FIG. 1 shows a communication system according to the present invention, labeled in its totality as 1. Communication system 1 includes multiple users 2, 3, 4 interconnected by a bus system 5 which operates on a distributed basis for exchange of data. Users 2, 3, 4 may be controllers in a motor vehicle, for example. Data to be exchanged is contained in messages transmitted by users 2, 3, 4 over bus system 5. For users 2, 3, 4 of bus system 5, there is a common global time base t_gl which is synchronized to an external reference time t_ref at a preselectable time t_synch.

Users 2, 3, 4 include a computer (process computer) designed as a microprocessor 6. A computer program capable of running on microprocessor 6 is stored in a memory element 7 in the form of a flash memory. This computer program is suitable for carrying out the method according to the present invention. The computer program is loaded into microprocessor 6 before or during processing. Users 2, 3, 4 also include a communication controller 8 connected to microprocessor 6 over an interface 9. Communication controller 8 establishes a connection between users 2, 3, 4 and bus system 5.

Figure 2:
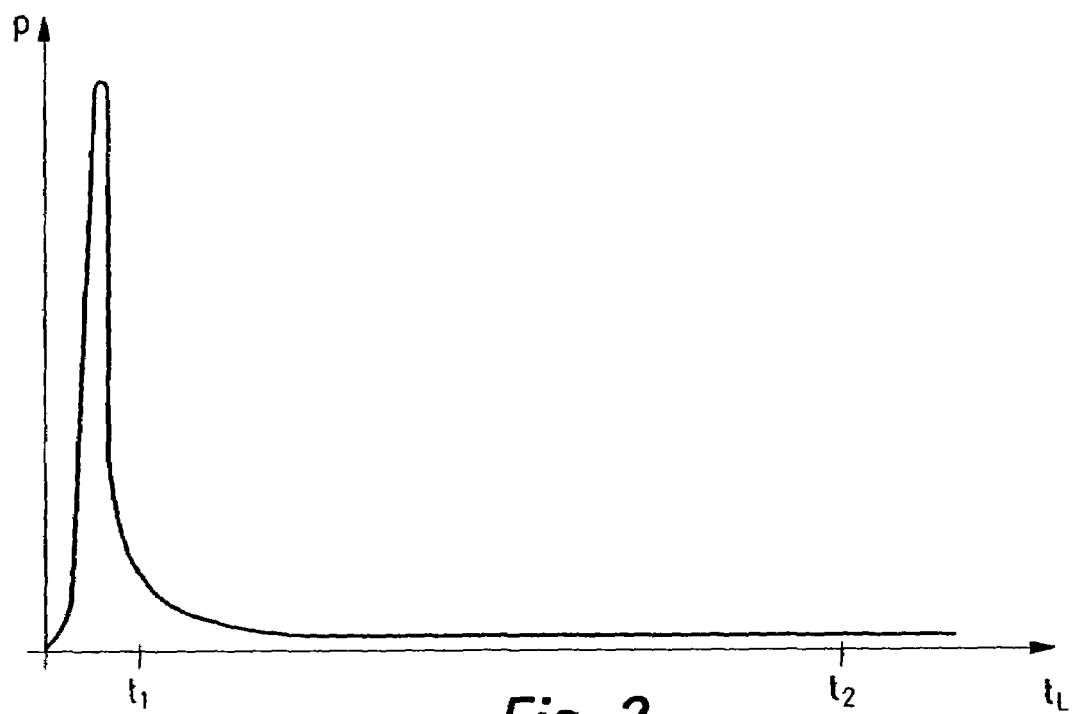
FIG. 2 shows a probability distribution of latencies in an event-controlled communication system.

FIG. 2 shows a probability distribution of latencies $t_L$ for an event-controlled communication system. A short latency $t_1$ of less than $t_L$ occurs with a probability p of approximately 99.9%. With a probability p of approximately 0.00001=10 ppm, a very long latency $t_L$ greater than $t_2=100 \cdot t_1$ occurs. It can be seen on the basis of relatively high probability p of a short latency $t_L$ and theoretically possible infinite latency $t_L$ that an event-oriented protocol is very suitable for the normal case (very high probability p for short latencies $t_L$) but is less suitable for the worst case.

Figure 3:
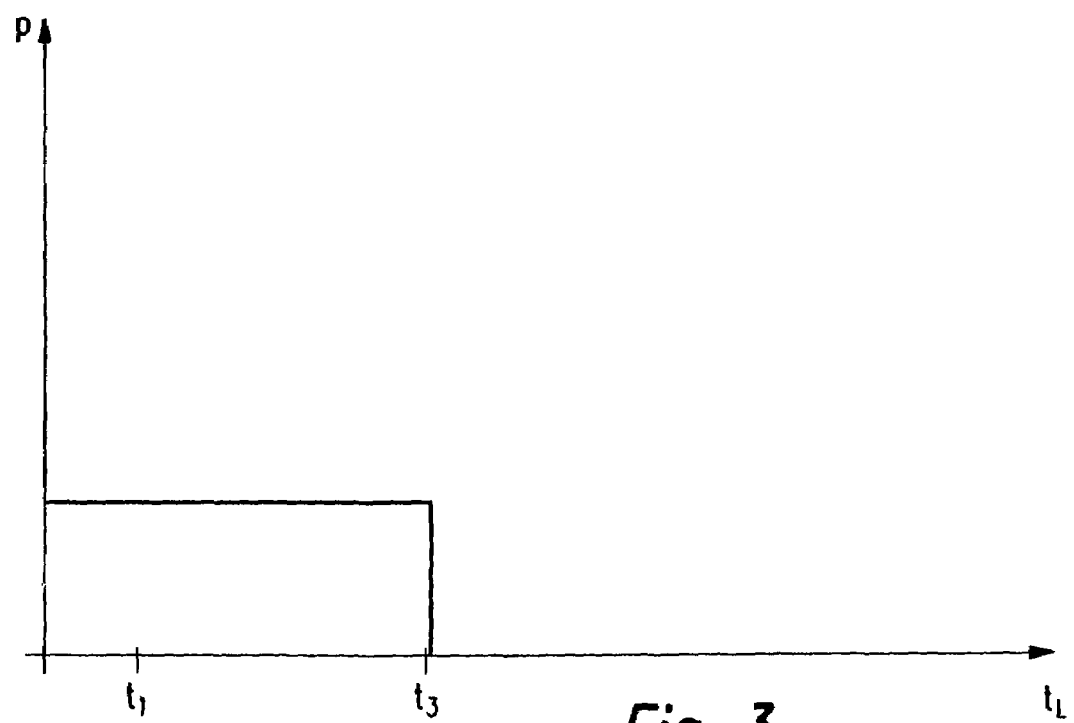
FIG. 3 shows a probability distribution of latencies in a deterministic communication system.

FIG. 3 shows a probability distribution of latencies $t_L$ for a deterministic communication system. This is a uniform distribution. A short latency $t_L$ less than $t_1$ occurs with a relatively low probability p of approximately 10%. Latency $t_L$ which is the largest occurring is $t_3 \approx 10 \cdot t_1$. Probability p of a very long latency $t_L$ greater than $t_3$ is 0. Latencies $t_L$ depend only on the time interval to the next transmitting time. In the normal case and in the worst case, these probabilities are equal, and an upper limit for maximum latency $t_2$ may be given—in contrast with an event-oriented communication system. Deterministic communication systems are thus suitable for applications in which the worst case must be tolerated, even if restrictions must then be accepted for the normal case.

According to the present invention, data is transmitted by an event-oriented method over bus system 5 as long as a preselectable latency $t_L$ can be ensured for each message to be transmitted as a function of utilization of capacity of bus system 5. Otherwise, the data is transmitted over bus system 5 by a deterministic method. Data transmission is switched from event-oriented transmission to deterministic transmission if a critical state is detected, i.e., a preselectable latency $t_L$ cannot be guaranteed for each message to be transmitted.

Figure 5:
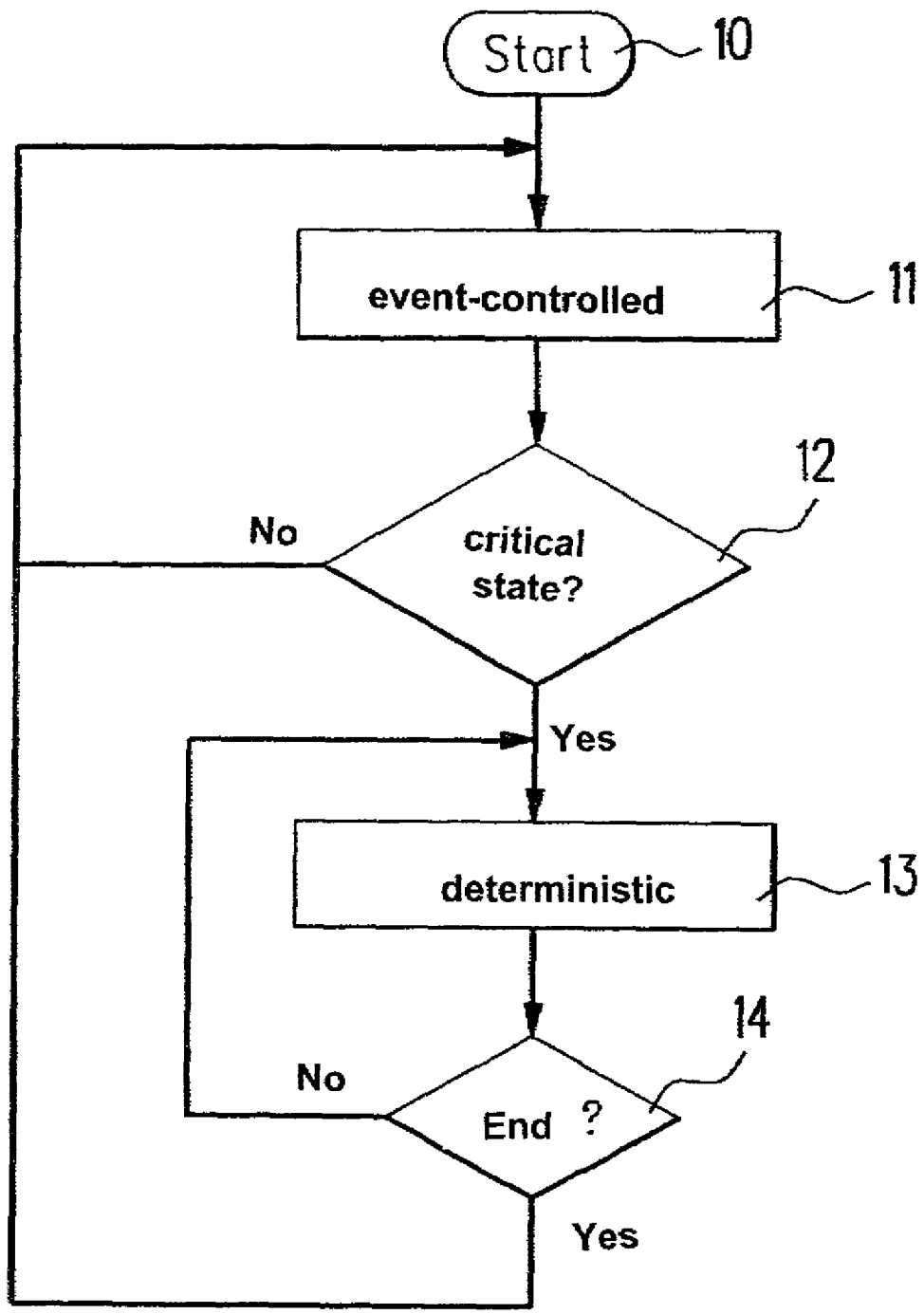
FIG. 5 shows a flow chart of a method according to a preferred embodiment of the present invention.

The method according to the present invention will now be explained in greater detail on the basis of FIG. 5. This method begins in a function block 10. In a function block 11, an event-oriented data transmission over bus system 5 is set. As soon as a critical state is detected in communication system 1, there is a switch to a deterministic data transmission. A critical state means that a preselectable latency $t_L$ cannot be guaranteed for each message to be transmitted as a function of the utilization of capacity of the bus system. A critical state is detected in query block 12. If there is no critical state, the system branches off to function block 11, and data is still transmitted over bus system 5 by an event-controlled method. However, if a critical state is detected, the system switches to deterministic data transmission in a function block 13.

A critical state of a communication system 1 occurs when all users 2, 3, 4 are attempting to transmit a message continuously. From the standpoint of communication system 1, this state is not critical when the capacity of bus system 5 is not utilized for a sufficient length of time. It is therefore suggested that the critical state be defined by the fact that such a pause (capacity of bus system 5 not utilized) occurs at least during a certain period of time. Therefore, utilization of bus system 5 in time may be monitored, for example. A critical state occurs when bus system 5 is utilized to capacity without interruption for a period of time exceeding a preselectable threshold. As an alternative, the number of messages transmitted over bus system 5 may also be considered. A critical state occurs when the number of messages transmitted in succession without a pause over bus system 5 exceeds a preselectable threshold.

It is within the nature of a deterministic data transmission that an end of the data transmission is predetermined from the beginning. In a query block 14, a check is performed to determine whether the end of the deterministic data transmission has been reached. If this is the case, the method branches off to function block 11 and communication system 1 is switched back to the event-oriented transmission. If the end of the deterministic data transmission has not yet been reached, the method branches off to function block 13 and data continues to be transmitted by the deterministic method.

As an alternative or in addition to determination of the end of the deterministic data transmission, a check is also performed in query block 14 to determine whether the utilization of capacity of bus system 5 still necessitates a deterministic data transmission at all. It would also be conceivable to switch to the event-oriented data transmission even before reaching the end of the deterministic data transmission if the utilization of capacity of bus system 5 were to fall below a preselectable threshold.

Figure 4:
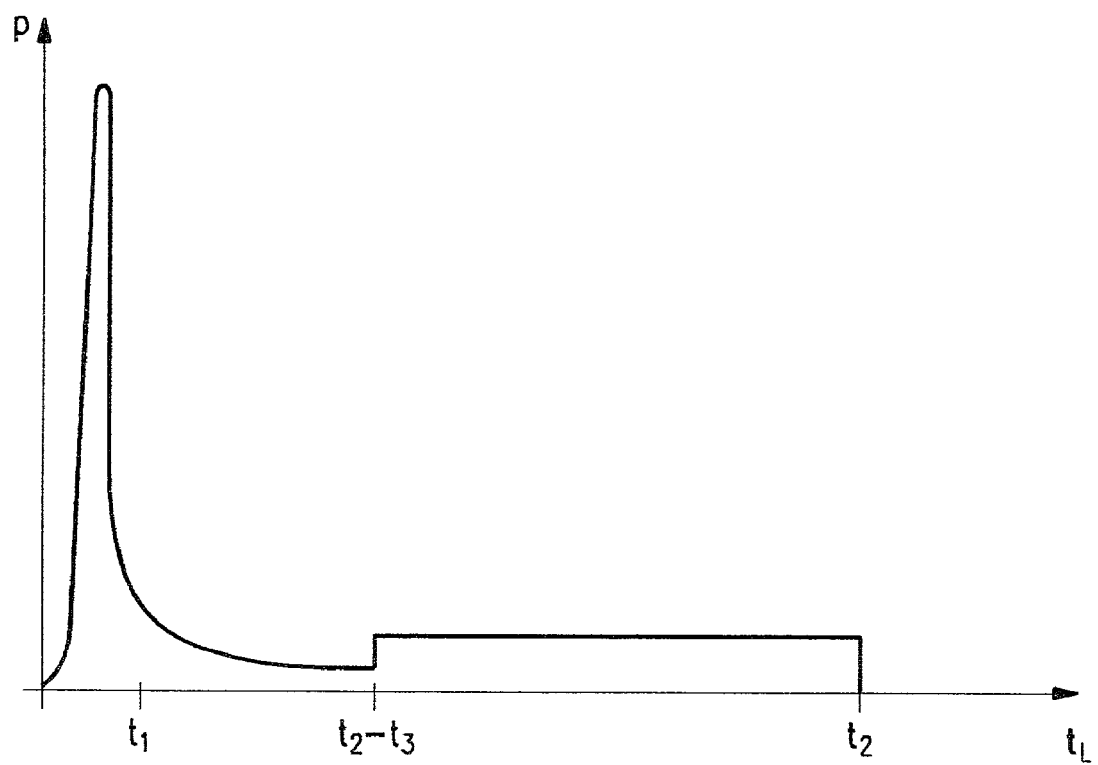
FIG. 4 shows a probability distribution of latencies in a communication system according to the present invention.

FIG. 4 shows the probability distribution of latencies $t_L$ in communication system 1 according to the present invention. For short latencies $t_L$, the distribution matches the distribution known from FIG. 1. Instead of the infinite extent of the distribution, the area under the curve of the distribution is forced into a uniform distribution for long latencies $t_L$ so that the integral under the distribution curve is still 1. Therefore, the probability distribution for extremely long latencies $t_L$ is 0. In the transition from event-oriented transmission (from 0 to $t_2$-$t_3$) to the deterministic transmission (from $t_2$-$t_3$ to $t_2$), FIG. 4 shows a jump in the probability distribution. However, the height of the distribution can be varied as desired through a suitable shifting of $t_2$ so that a continuous transition from event-oriented transmission to deterministic transmission may be achieved easily.

With the sample numbers given above, probability p for short latencies $t_L$ of less than $t_1$ is still very high, namely 99.9%. After a time $t_2$-$t_3$, the total remaining probability p is equally distributed in the interval from $t_2$-$t_3$ to $t_3$, so that probability p for a latency greater than $t_2$ is 0.

What is claimed is:

1. A method of exchanging data between at least two users that are interconnected over a bus system, the data being contained in messages transmitted by the users over the bus system, the method comprising the steps of:
   transmitting the data as event-oriented data over the bus system, as long as a preselectable latency elapsing between a transmission request by one of the users and an effected transmission operation of the one of the users is ensured for each message to be transmitted, as a function of a capacity utilization of the bus system; and
   if, and conditional upon that, the preselectable latency elapsing between the transmission request by the one of the users and the effected transmission operation of the one of the users is not ensured for each message to be transmitted, transmitting the data over the bus system according to a deterministic operation.

2. The method according to claim 1, further comprising the step of:
   monitoring the capacity utilization over time, wherein:
      the preselectable latency cannot be ensured for each message to be transmitted if an uninterrupted utilization of the bus system over time exceeds a preselectable time threshold.

3. The method according to claim 1, further comprising the step of:
   monitoring the capacity utilization, wherein:
      the preselectable latency cannot be ensured for each message to be transmitted if a number of messages transmitted in direct succession over the bus system exceeds a preselectable threshold.

4. The method according to claim 3, further comprising the steps of:
   counting by the user the messages transmitted in direct succession from the one of the users over the bus system; and
   transmitting a current number of the messages in direct succession over the bus system to others of the users.

5. The method according to claim 4, wherein:
   the current number of the messages being transmitted in direct succession in one of a cyclic redundancy check and another checksum is included in a count produced by the counting to ensure a data content of one of the messages and is transmitted together with the one of the messages.

6. The method according to claim 5, further comprising the step of:
   jointly forming the one of the cyclic redundancy check and the other checksum from the data content of the one of the messages and the current number of the messages being transmitted in direct succession.

7. The method according to claim 1, further comprising the step of:
   switching from the deterministic operation over the bus system to an event-oriented transmission when a predetermined end of the deterministic operation is reached.

8. The method according to claim 1, further comprising the step of:
   transmitting the data transmitted according to the deterministic operation in a time-triggered manner.

9. The method according to claim 8, wherein:
   the time-triggered manner corresponds to a time-division multiple-access (TDMA)-based operation.

10. The method according to claim 1, further comprising the step of:
    transmitting the data transmitted according to the deterministic operation with dynamically variable priorities of one of the messages and message groups on a priority shift basis.

11. A communication system, comprising:
    at least two users;
    a bus system over which the at least two users are interconnected for exchanging data among the at least two users, the data being contained in messages transmittable from the at least two users over the bus system;
    an arrangement for monitoring a capacity utilization of the bus system;
    an arrangement for performing an event-oriented transmission of the data over the bus system;
    an arrangement for performing a deterministic transmission of the data over the bus system; and
    an arrangement for selecting one of the event-oriented transmission and the deterministic transmission, wherein:
       the arrangement for selecting selects the event-oriented transmission, as long as a preselectable latency elapsing between a transmission request by one of the at least two users and an effected transmission operation on the part of the one of the at least two users is able to be ensured as a function of the capacity utilization of the bus system for each message to be transmitted, and
       the arrangement for selecting selects the deterministic transmission if, and conditional upon that, the preselectable latency elapsing between the transmission request by the one of the at least two users and the effected transmission operation of the one of the at least two users is not ensured for each message to be transmitted.

12. A memory element of a communication system for one of a plurality of users, the communication system being connected to at least another of the plurality of users over a bus system for an exchange of data, the memory element storing a program that is able to run on a computer of the one of the plurality of users, the program causing the computer to perform the steps of:
    transmitting the data as event-oriented data over the bus system, as long as a preselectable latency elapsing between a transmission request by the one of the plurality of users and an effected transmission operation of the one of the plurality of users is ensured for each message to be transmitted, as a function of a capacity utilization of the bus system; and if, and conditional upon that, the preselectable latency elapsing between the transmission request by the one of the plurality of users and the effected transmission operation of the one of the plurality of users is not ensured for each message to be transmitted, transmitting the data over the bus system according to a deterministic operation.

13. The memory element according to claim 12, wherein: the memory element includes one of a read-only memory, a random-access memory, and a flash memory.

14. The memory element according to claim 12, wherein: the computer includes a microprocessor.

15. A computer-readable medium having stored thereon program instructions for causing a computer to perform the steps of:
    transmitting data as event-oriented data over a bus system, as long as a preselectable latency elapsing between a transmission request by one of a plurality of users and an effected transmission operation of the one of the plurality of users is ensured for each message to be transmitted, as a function of a capacity utilization of the bus system; and
    if, and conditional upon that, the preselectable latency elapsing between the transmission request by the one of the plurality of users and the effected transmission operation of the one of the plurality of users is not ensured for each message to be transmitted, transmitting the data over the bus system according to a deterministic operation.

16. The computer-readable medium according to claim 15, wherein:
    the computer includes a microprocessor.

17. The computer-readable medium according to claim 15, wherein:
    the computer-readable medium is a memory element.

18. The computer-readable medium according to claim 17, wherein:
    the memory element includes a flash memory.

19. The method according to claim 1, wherein (a) the transmission of the data as event-oriented data and (b) the transmission of the data according to the deterministic operation are mutually exclusive.

20. The communication system according to claim 11, wherein (a) the selection by the arrangement of the event-oriented transmission and (b) the selection by the arrangement of the deterministic transmission are mutually exclusive.

\* \* \* \* \*